March 23, 1965

V. W. WHINERY ETAL 3,174,601

VARIABLE SPEED HYDRAULIC COUPLING

Filed Dec. 31, 1962

INVENTORS
Vernon W. Whinery
John H. Wolcott
John E. Tedstrom Jr.
BY
Fishburn and Gold
ATTORNEYS

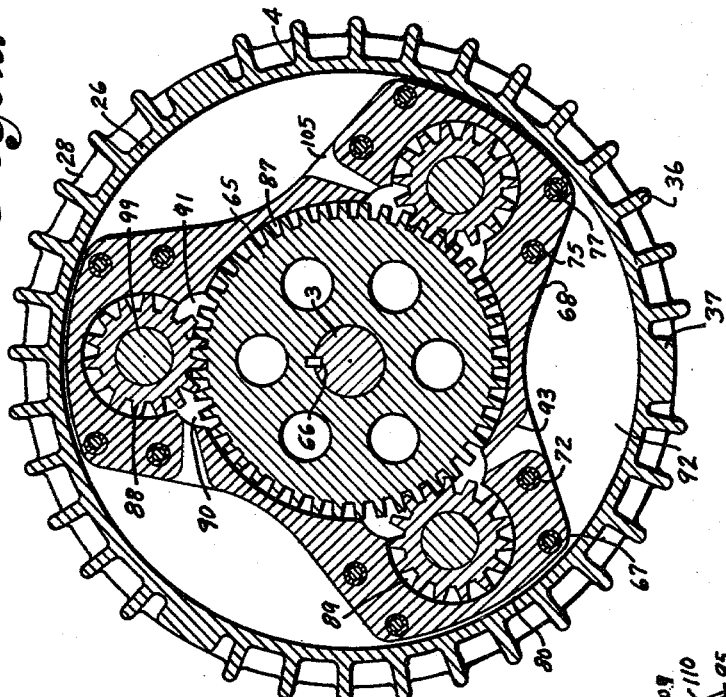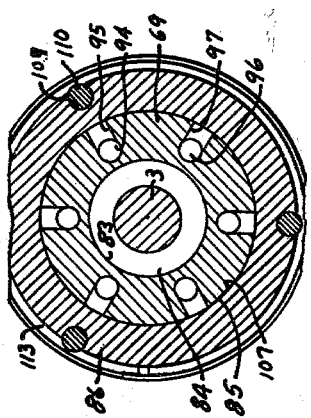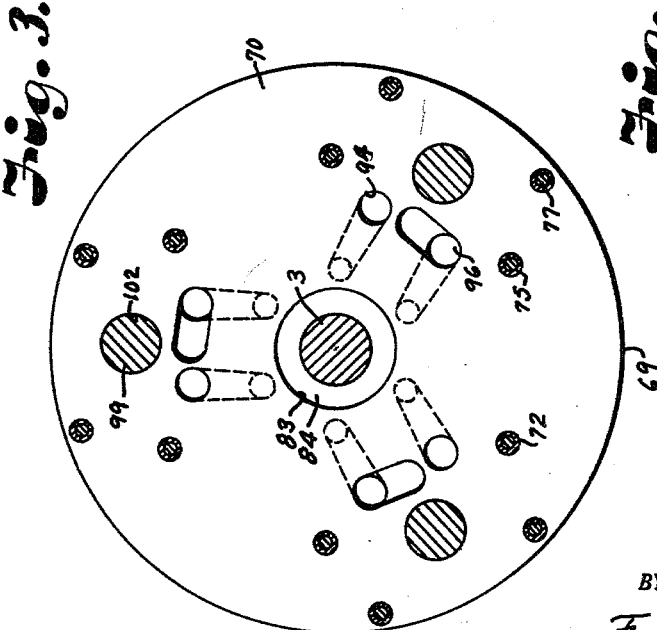

United States Patent Office 3,174,601
Patented Mar. 23, 1965

3,174,601
VARIABLE SPEED HYDRAULIC COUPLING
Vernon W. Whinery and John H. Wolcott, Kenosha, Wis., and John E. Tedstrom, Jr., Parsons, Kans., assignors to Eaton Manufacturing Company, Cleveland, Ohio, a corporation of Ohio
Filed Dec. 31, 1962, Ser. No. 248,483
6 Claims. (Cl. 192—61)

This invention relates to variable speed hydraulic couplings or clutches, and more particularly to such devices of the type employing a rotatable casing driven by a prime mover and in which casing two fluids of different resistant values are employed and the control of the fluids through a fluid-circulating and power-transmitting instrumentality provides varying speeds to a driven shaft extending into the casing.

This invention relates to a variable speed hydraulic coupling or clutch of the general type shown and described in our co-pending application on "Variable Speed Hydraulic Coupling," Serial No. 132,797, filed August 21, 1961, now Patent No. 3,078,976, and is an improvement thereover in the relative arrangement of the parts providing ease of assembly, better control position and easier maintenance.

According to the embodiment of the present invention disclosed in the attached drawings, the clutch or coupling casing is driven by a drive shaft affixed thereto at the pump end thereof, and a driven shaft extends coaxially into the other end of the casing with a sun gear of a planetary gear type pump keyed thereto. The casing carries preferably a plurality of planetary gears meshing with the sun gear which is mounted on the driven shaft. In operation, the casing is partially filled with oil which occupies an annular space near the outer periphery of the casing when the latter is rotated by the driving shaft and during such operation the central portion of the space within the casing is occupied by air. In neutral position, when it is desired that no coupling be established between the driving and driven shafts and with a control valve in open position, air enters the inlet ports of the pump and the planetary gears together with the casing will rotate about the stationary sun gear and will be effective to pump air which is freely discharged into the central air space within the casing, and no drive from the driving shaft to the driven shaft is transmitted because the movement of air through the pump offers no appreciable resistance. When it is desired to establish a driving connection between the shafts, the control valve is operated to close the air intake ports whereby oil from the annulus of oil within the casing will be drawn into the oil intake ports and circulated through the pump and discharged through the oil discharge ports. During the rotation of the casing, the suction created by the pump gears will cause flow of oil into the pump and provide resistance, and since the discharge ports are adapted to be restricted by the control valve, considerable resistance to the pumping effort is introduced, and this resistance manifests itself in an attempt of the planetary gears to drag the sun gear around with them, thus imparting an increased speed to the driven shaft. The change or increase in speed may be progressive by progressively restricting the discharge ports. When the discharge ports are completely closed, the inlet ports communicating with the oil annulus being always open, the tendency of the pump gears to draw in oil will cause the pump to be completely filled with oil alone. When the discharge ports are completely closed, the panetary gears will be unable to rotate relative to the sun gear to effect pumping, and the driven and driving shafts will thus be locked together in substantially one-to-one driving relationship in the desired direction of rotation.

The principal objects of the present invention are to provide a simplified construction of variable speed hydraulic couplings where in reduction in cost of manufacture and assembly is attained and also through a simplified connection with an input shaft there is ease of installation and repair; to provide such a structure with continually open oil intake ports or openings and a single combined fluid intake and discharge valve for controlling the flow of both air and oil through the pump; to provide such a structure with a central communicating passage between the central portion of the casing and the interior of the pump adjacent the central portion of the sun gear to aid in dissipation of heat therefrom and eliminate possible pressure accumulation therein; to provide such a structure in which rotation together with the interior shape of the casing induces flow of oil and the exterior shape of the casing and fins thereon induce flow of cooling air to dissipate heat created by the pump; to provide such a structure wherein the casing can be removed without separating the pump from the operative connection with the drive shaft; to provide such a structure that will serve as an engaging clutch and a speed controlling unit that will smoothly start any load the prime mover can pull when running at its full speed and power and provide shock-absorbing protection to all parts of the prime mover and transmission through its flexible hydraulic operation; to provide such a structure wherein the shaft supports, connections and packings are arranged that any leakage in the pump inwardly toward the shaft carrying the sun gear will return to the interior of the casing and thereby substantially eliminate leakage of oil by shaft seals; and to provide a variable speed hydraulic coupling that is efficient in operation and capable of long life under severe operating conditions.

Other objects and advantages of this invention will become apparent from the following description taken in connection with the accompanying drawings wherein are set forth by way of illustration and example certain embodiments of this invention.

FIG. 1 is a longitudinal sectional view through a hydraulic coupling embodying the present invention, with the valve in discharge port closing position whereby the pump locks the driving and driven shafts together.

FIG. 2 is a transverse sectional view through the coupling taken on the line 2—2, FIG. 1.

FIG. 3 is a transverse sectional view through the fluid pump taken on the line 3—3, FIG. 1.

FIG. 4 is a transverse sectional view through the air intake and oil discharge ports taken on the line 4—4, FIG. 5.

FIG. 5 is a fragmentary longitudinal sectional view through the pump and valve with the valve in port-open position.

Referring more in detail to the drawings:

1 generally designates a variable speed hydraulic clutch or coupling operable to effect a drive from a rotary power driven means such as a drive shaft 2 to a driven member or shaft 3 through a casing 4 and a fluid pump 5 located therein. The drive shaft 2 may be driven by any suitable prime mover or may be the armature shaft of an electric motor or the crankshaft of an internal combustion engine. In the structure illustrated, the drive shaft 2 has an end portion 6 adapted to be connected to a suitable prime mover (not shown) and at the opposite end said shaft is provided with a flange 7 having a cylindrical periphery 8 with a portion of said periphery engaging the inner surface 9 of a cylindrical recess 10 in an end plate 11 of the casing whereby the flange is centered to position the drive shaft 2 coaxial with the casing. The flange 7 is secured to the casing end plate 11 of the casing whereby the flange is centered to position the drive shaft 2 coaxial with the casing. The flange 7 is secured to the casing end plate 11 by suitable fastening devices such as cap screws 12 which have threaded shanks 13 screwed into threaded sockets 14 in the end plate 11. In the structure illustrated, the end plate 11 has a hub portion 15 with an outwardly extending ring portion 16 spaced radially outwardly of the hub to provide suitable thickness for the threaded sockets 14 whereby the inner ends 17 of said sockets are spaced outwardly from both an inner face 18 of the end plate and also an annular recess 19 therein, so that no leakage can occur through said connection. This structure also provides a connection wherein the cap screws 12 can be removed and with slight axial movement the casing end plate 11 can be separated from the flange 7 for complete disconnection and removal of the casing and coupling from the drive shaft 2.

The casing 4 generally includes a body section 20 having opposed open ends 21 and 22 with openings 21' and 22' respectively. The opening 22' is defined by an inwardly extending flange 23 with the body section having a wall 24 extending from the flange 23 axially or longitudinally and outwardly to define a frusto-conical shape that merges as at 25 in a cylindrical wall portion 26 that extends to the other end 21 remote from the flange 23. An annular flange 28 is arranged on the wall portion 26 adjacent the open end 21 and having an end face 29 adapted to be engaged by a face 30 of an annular flange portion 31 of the end plate 11, said end plate being secured to the casing by suitable fastening devices such as cap screws 32 having threaded shanks 33 screwed into threaded sockets 34 in the flange 28 with a suitable seal member 35 compressed therebetween to form a seal to prevent leakage from the interior of the casing. The casing is provided with outwardly projecting ribs or fins 36 integral therewith, said ribs extending radially outwardly from the flange 28 and from the end 21 to beyond the other end 22 of the casing, as illustrated in FIG. 1, the outer edges of the ribs for substantially the length thereof being preferably of uniform distance from the axis, said fins serving to strengthen the casing and also as cooling fins. There are also additional outwardly projecting ribs 37 on the casing body section that serve as balancing members. Also to aid in cooling the structure, the end plate 11 has a plurality of ribs or fins 36' that extend from the ring portion 16 to the annular flange portion 31 of said end plate. These ribs 36' also function as strengthening ribs.

The open end 22 of the casing is preferably arranged with an end plate 38 having an annular flange 39 with a cylindrical periphery 40 that engages the inner surface 41 of a cylindrical recess 42, the inner face of the flange 39 engaging the outer face of the flange 23 with a suitable seal member 43 compressed therebetween to form a fluid-tight seal. In the structure illustrated, the end plate 38 is suitably secured to the casing as by means of a cap screw 44 having a threaded shank 45 screwed into a threaded bore 46 in the flange 23. The end plate 38 has a hub portion 47 that extends inwardly of the casing and also an outwardly extending sleeve hub portion 47', said sleeve having a bore 48 through which an output or driven shaft 3 extends.

The casing including the body portion 20, the end plate 11 and end plate 38, defines a chamber 49 therein, and in the illustrated structure the inner surface of the wall portion 26 is machined from the end 29 to the point 25 wherein the cylindrical wall portion merges with the frusto-conical wall portion to provide a pump-receiving portion of the casing. The hub portion 15 of the end plate 11 has an axial bore 50 extending from the inner face 18 and terminating in spaced relation to the outer end 51 of the hub. A suitable bearing 52 such as a needle bearing is mounted in the bore 50 and is adapted to receive a reduced end portion 53 of the shaft 3 to rotatably support said end of the shaft. The hub portion 47 of the end plate 38 is provided with a counterbore 54 and a further counterbore 55 to receive a packing or shaft seal 56 and an anti-friction bearing 57 respectively whereby the bearing 57 cooperates with the bearing 52 to rotatably mount the driven shaft 3 that extends from the bore 50 in the end plate 11 through the casing and through the bore 48 of the sleeve hub 47' of the end plate 38 with a projecting portion 58 adapted to be suitably connected with a mechanism to be driven. In the structure illustrated, a keeper ring 59 is mounted in a groove 60 in the shaft 3 to engage the inner end of the bearing 57 and a keeper ring 61 is mounted in the groove 62 in the hub 47 to also engage the bearing so that the rings cooperate with the end plate 38 and a shaft shoulder 63 which engages the other end of the bearing to substantially hold the shaft 3 against endwise movement relative to said end plate 38.

A centrally disposed sun gear 65 is rigidly secured to the shaft 3 adjacent the reduced end portion 53 as by a key 66 whereby the sun gear 65 is in a position to lie within the axial center of the pump 5, as later described. The pump 5 has a housing 67 which, in the illustrated structure, includes a body 68 with the end plate 11 forming one side of the housing and a manifold member 69 having a plate portion 70 forming the other side of said housing. The flange 70 of the manifold member 69 and the end plate 11 and the body portion 68 have aligned bores 71 with counterbores 72 extending from opposite sides of the body member inwardly thereof and registering with bores 73 in the end plate 11 and counterbores 74 extending into the plate 70 of the manifold member from adjacent the body member 68 to receive dowel bushings 75 that tightly engage in said counterbores to maintain the manifold member 69, pump body member 68 and end plate 11 in coaxial and selected position. The end plate 11, body member 68 and manifold member 69 are secured together by suitable fastening devices such as cap screws 76 that have shanks 77 that extend through the bushings 75 and have threaded ends 78 screwed into threaded portions 79 of the bores in the plate portion 70 of the manifold member 69, as illustrated in FIG. 1.

The peripheral portions of the body member 68 and the plate 70 of the manifold member 69 is smaller than the machined cylindrical portion 26 of the casing body whereby the pump body may be positioned therein with clearance or space 80 for oil flow therebetween. This clearance is relatively small whereby the oil flow between the periphery of the plate member 70 and the machined portion of the body is thin to facilitate cooling of the oil as it moves along the inner surface of the body of the casing which is cooled by air flow induced by the fins 36.

The manifold member 69 and plate 70 thereof have an inner face 81 that cooperates with the inner face 18 of the end plate 11 to define inner planar surfaces engaged by the outer surface of the pump body member 68 and also by outer surfaces of the gears as later described. The manifold member 69 has an extension or hub portion 82 extending therefrom toward the end plate 38, said extension having a bore 83 substantially larger than the portion of the shaft 3 extending therethrough to provide a passage 84 therebetween. The hub or extension 82 also has a peripheral portion 85 machined to form a cylindrical portion on which a valve member 86 is sleeved, as later described.

The pump body 68 is provided with a cavity 87 of a diameter to snugly receive therein the sun gear 65, the cavity 87 having segmental openings opposite planetary gears 88 where same mesh with the sun gear 65. The pump body 68 is also provided with a plurality of cavities 89 for the planetary gears 88 which operatively mesh with the sun gear 65. The pump body cavities 89 for the planetary gears 88 are of a diameter to snugly receive therein the planetary gears 88. The gears in their respective cavities have sides of the teeth and portions adjacent thereto slidably engaging the faces 18 and 81 of the end plate 11 and manifold plate 70 respectively to resist oil movement thereby. The spaces 90 on one side of each of the pump couples comprised by one of the planetary gears 88 and the sun gear 65 constitute inlet chambers for the pump, and the spaces 91 on the opposite sides of each couple constitute outlet or discharge chambers for the pump. The fastening devices or screws 76 and the bores therefor are spaced from the cavities 89 and lie around same, as illustrated in FIG. 2, and the body 68 is cut-away in outwardly spaced relation from the bores 71 between the planet gears, as illustrated in FIG. 2, to provide pockets or cavities 92 and, due to the clearance as at 80 between the periphery of the body and the portion 26 of the casing, oil will pass into the pockets or cavities 92. Each of the inlet chambers 90 is connected by an inlet port or passage 93 opening through the pump body and communicating with the pockets or cavities 92 as illustrated in FIG. 2. The inlet chambers 90 are also connected by passages 94 extending through the manifold member 69 and outwardly in the hub or extension 82 to air inlet ports 95 extending radially through the hub portion to communicate with the chamber 49 of the casing 4, there being a passage 94 and an air inlet port 95 for each of the inlet chambers 90. Each of the discharge chambers 91 is connected by a passage 96 which extends through the manifold member and hub or extension 82 to a discharge port 97, there being a passage 96 and a discharge port 97 for each of the discharge chambers 91. In the illustrated structure, the planetary gears 88 are rotatably mounted by bearings 98 on respective pins 99 which have end portions 100 extending into axially aligned recesses 101 and 102 in the end plate 11 and the manifold plate 70 respectively with said pins secured relative to the end plate 11 by suitable fastening devices 103 such as cap screws which have threaded shanks screwed into threaded sockets 104 in ends of the pins 99 whereby said pins are positively positioned and fixed in place to rotatably mount the planet gears.

In operation, the annulus of oil within the casing is such that the inlet opening 105 of the passage 93 lies in the oil, and the portion of the hub 82 having the ports 95 and 97 therein is of such diameter that said ports open into the zone of air. The inner periphery of the oil annulus is preferably defined by the broken lines 106 in FIG. 1 which is radially outwardly relative to the inlet chamber 90. The fluid intake and discharge control valve 86 consists of a cylindrical hollow body having a bore 107 whereby the valve member is sleeved on and engaged with the portion 85 of the hub 82 of the manifold member 69 and is movable axially thereof with the end 108 of said valve member adjacent the pump being planar or in a plane transverse to the axis of the hub 82.

The valve member has circumferentially spaced bores 109 spaced outwardly from the bore 107 for receiving shifter rods 110, the end portions of the shifter rods in the valve member having slots 111 registering with a groove 112 in the valve member for receiving a snap ring 113 to retain the shifter rods operatively connected with the valve. The shifter rods extend through bores 114 in the end plate 38, said end plate being provided with circumferentially spaced bosses 115 having counterbores 116 therein for mounting suitable packing 117 to prevent oil leakage from the casing. At their outermost ends, the shifter rods 110 extend into openings in a rotatable shifter sleeve 118 and are held therein by suitable fastening means such as pins 119. The shifter sleeve 118 is mounted on the sleeve-like hub 47' for axial sliding movement therealong. There is no relative rotation between the shifter sleeve 118 and the sleeve-like hub portion 47' since the shifter rods 110 rotate with the end plate 38 of the casing. A non-rotatable shifter collar 120 is mounted upon the shifter sleeve 118 as by means of a ball bearing assembly 121, said collar being held with the bearing against longitudinal movement relative to the shifter ring by means of suitable fastening devices such as split rings 122 and 123. The shifter collar is provided with diametrically opposed studs 124 which are adapted to be continuously engaged with forked ends of a well-known valve shifting lever to effect concurrent axial shifting movement of the sleeve 118, rods 110 and valve member 86.

The air inlet ports 95 are substantially smaller or shorter in length longitudinally of the movement of the valve member than the discharge ports 97. Also, the air inlet ports are arranged whereby as the valve member is moved to progressively open the discharge ports 97 the air inlet ports have their ends remote from the pump substantially in alignment with the ends of the discharge ports remote from the pump so that the air inlet ports begin to open near the point at which the discharge ports approach open position with both the air inlet ports and the discharge ports being fully open when the valve member is in port-opening position as illustrated in FIG. 5.

With a structure constructed as described, the seal member 56 and bearing 57 are assembled on the shaft 3 and then positioned in the end plate 38. The keeper rings 59 and 61 are then arranged in their respective grooves to retain the shaft bearing and seal member relative to the end plate 38. The valve member 86 is then mounted on the shifter rods 110 and retained in place by the snap ring 113. The shifter sleeve 118 is mounted on the sleeve hub 47' and the shifter collar 120 with the bearing 121 positioned therein is mounted on the shifter sleeve 118 and retained in place by the rings 122 and 123. The shifter rods 110 are then secured to the shifter sleeve by the pins 119, and the assembly on the end plate 38 is then all applied to the casing and said plate secured in place by the fastening devices 44. The sun gear 65 and planet gears 88 are then assembled in the cavity of the pump housing with the body 68 positioned on the manifold member 69 with the dowel bushings 74 holding the body member and manifold member in selected aligned position. Then the end plate 11 is mounted on the body member 68 in aligned relation on the dowel bushings 75 and said end plate secured to the body and manifold member by the screws 76. The pump housing is then inserted into the body member of the casing and the shaft 3 moved to align the key 66 with the keyway of the sungear 65, and then the pump further moved into the casing to position the sun gear on the shaft 3 with the end portion 53 of the shaft in the bearing 52. Then the screws 32 are inserted to secure the end plate to the body of the casing in a fluid-tight relation. A plug 125 is then removed from an opening 126 into the interior chamber 49 of the casing, and a suitable quantity of oil inserted therein, and the plug 125 then replaced. When desired, the shaft or drive member 2 is connected to the end plate member 11 by means of the fastening devices 12, and the structure is then ready for operation when connected to the prime mover by the drive shaft 2 and to the member to be driven by the driven shaft 3.

In the operation of the coupling structure assembled as described and connected to a prime mover and member to be driven, and with the valve member 86 in port-opening position, as illustrated in FIG. 5, the chamber 49 being partially filled with oil to provide an oil annulus extending radially inwardly to the line 106 as the casing is rotated by the drive shaft 2, the shaft 3 will not be driven. When the valve is in port-opening position, it is in what may be termed a "neutral" position, and in such operation the oil is prevented from entering the pump intake chamber 90 and the adjacent regions of the gear teeth by centrifugal forces acting upon the oil during the rotation of said casing. The air inlet ports being open, air will be drawn through said ports 95 and passages 94 to the inlet chamber 90, and air having substantially no resistance the rotation of the casing and the pump housing therewith will cause the planet gears to planet around the sun gear, or roll about the sun gear, functioning to pump only air from the air zone through the pump and through the discharge ports. Such circulation of air alone will not be effective to transmit power to the driven shaft 3 against any appreciable resistance. When it is desired to drive the driven shaft 3 and effect rotation thereof and with the drive shaft 2 and casing 4 continuing to rotate, the shifter sleeve 118 is moved toward the casing to move the valve member 86 toward the pump progressively closing the air inlet ports 95 and the oil discharge port 87. The progressively decreasing quantity of air that will enter the air inlet ports and the pump to supply the volume of displacement will result in a progressively increasing quantity of oil entering the pump through the openings 105 and passages 93, there being a blend of air and oil moving through the pump until the air inlet ports are closed. Then the discharge ports 97 being partially closed, will provide only slight restriction to a full displacement of oil entering into the pump cavities and pump gear teeth, resulting in transmission of more torque to the driven shaft. As the valve member is further moved toward the pump, it progressively closes the discharge ports 97 restricting said discharge, increasing the resistance to the planet gears 88 rolling about the sun gear 65 and thereby applying increased torque and/or speed to the driven shaft 3. When the discharge ports 97 are completely closed, the fluid discharged from the gear pump is arrested providing a hydrostatic lock in the gear pumps and thereby providing a drive of the driven shaft at substantially the same speed as that of the drive shaft and the casing. The oil inlet ports 105 being fully open at all times, the movement of the valve member from a neutral position to restrict the oil discharge provides resistance to effect the drive of the driven shaft whereby the speed may be varied from zero to a ratio of one-to-one as desired.

The rotation of the casing causes the air surrounding the casing to flow thereover, and particularly the projecting portions of the fins from the end of the casing remote from the pump causes an outward flow so that the air moves outwardly and longitudinally of the casing between the fins 36 and along the wall portion 24, and then along the wall portion 26. This air flow cools the casing wall and thereby cools the oil in the casing particularly as the oil moves along said casing. The frusto-conical portion of the interior of the casing wall portion 24 causes centrifugal force to tend to move the oil to the inlet of the thin passage 80 to maintain a thin layer of oil between the periphery of the plate portion 70 and the interior of the wall portion 26. This thin layer of oil assures maximum cooling of the oil and resulting uniform efficiency, particularly cooling the oil before it re-enters the pump. Also, the shape of the interior of the casing particularly by the frusto-conical wall portion 24 maintains a supply of oil for passage through the narrow passage 80 to the pump at all times even though the quantity of oil in the casing should become lower than that desired.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. A variable speed hydraulic coupling interposed between rotary power driven means and a driven shaft comprising,
    (a) a rotatable casing having opposed ends with openings at each end, said casing having a peripheral wall that extends substantially longitudinally and outwardly from adjacent one end to define a substantially frusto-conical portion and then longitudinally therefrom to define a substantially cylindrical portion that extends to the other end and terminates at said opening at said other end,
    (b) an end plate secured to the peripheral wall at said one end in fluid-tight engagement to close the opening therein,
    (c) a second end plate secured to the peripheral wall at said other end in fluid-tight engagement to close the opening therein,
    (d) a drive shaft operatively connecting the rotary power driven means with the casing to rotate the casing in response to rotation of the drive shaft,
    (e) said driven shaft being rotatably mounted in said one end plate and extending into said casing coaxially of said drive shaft,
    (f) a gear pump type transmission mechanism including a body in said casing,
    (g) a manifold member,
    (h) means securing the manifold member to said second end plate with the pump body therebetween whereby said second end plate and manifold member are sides of said pump mechanism,
    (i) said manifold member having a periphery slightly spaced from the peripheral wall of the casing to define a thin oil passage therebetween.
    (j) said pump having one gear fixed to the driven shaft and at least another gear rotatably mounted in said body in meshing engagement with said one gear to form a pump,
    (k) said body having inlet and outlet chambers oppositely disposed relative to the meshing portions of the respective gears,
    (l) said casing being partially filled with oil whereby during rotation of said casing there is provided an outer and inner zone of oil and an inner central zone of air with said inlet and outlet chambers radially inwardly of said oil zone,
    (m) an oil inlet passage in said body communicating the inlet chamber with the oil zone between the body and the casing and having an inlet opening disposed within the zone of oil constantly fully open to the inflow of oil to the inlet chamber of said pump mechanism,
    (n) a radially disposed air intake port in said manifold member and having communication therethrough to the inlet chamber,
        said manifold having a passage communicating the air zone with the interior of the pump body inwardly of the inlet and outlet chambers in the pump body,
    (o) a radially disposed fluid discharge port in said manifold member and circumferentially spaced from the air intake port and having communication therethrough with the outlet chamber,
    (p) and a valve member movable to selectively open and close the air intake and fluid discharge port.

2. A variable speed hydraulic coupling interposed between rotary power driven means and a driven shaft comprising,
    (a) a rotatable casing having opposed ends with openings at each end, said casing having a peripheral wall that extends substantially longitudinally from adjacent one end to the other end and terminates at said opening at said other end,
    (b) an end plate secured to the peripheral wall at said one end in fluid-tight engagement to close the opening therein,
    (c) a second end plate secured to the peripheral wall at said other end in fluid-tight engagement to close the opening therein,
    (d) a drive shaft operatively connected with the rotary power driven means and having one end secured to said second end plate to rotate the casing in response to rotation of the drive shaft,
    (e) said driven shaft being rotatably mounted in said one end plate and extending into said casing coaxially of said drive shaft, (f) a gear pump type transmission mechanism including a body in said casing,
(g) a manifold member,
(h) means securing the manifold member to said second end plate with the pump body therebetween whereby said second end plate and manifold member are sides of said pump mechanism,
(i) said manifold member having a periphery slightly spaced from the peripheral wall of the casing to define a thin oil passage therebetween,
(j) said pump having one gear fixed to the driven shaft and at least another gear rotatably mounted in said body in meshing engagement with said one gear to form a pump,
(k) said body having inlet and outlet chambers oppositely disposed relative to the meshing portions of the respective gears,
(l) said casing being partially filled with oil whereby during rotation of said casing there is provided an outer and inner zone of oil and an inner central zone of air with said inlet and outlet chambers radially inwardly of said oil zone,
(m) an oil inlet passage in said body communicating the inlet chamber with the oil zone between the body and the casing and having an inlet opening disposed within the zone of oil constantly fully open to the inflow of oil to the inlet chamber of said pump mechanism,
(n) said manifold member having an axial bore defining a passage surrounding the driven shaft and communicating the air zone with the interior of the pump body in inwardly spaced relation to the inlet and outlet chambers in the pump body,
(o) a radially disposed air intake port in said manifold member and having communication therethrough to the inlet chamber,
(p) a radially disposed fluid discharge port in said manifold member circumferentially spaced from the air intake port and having communication therethrough with the outlet chamber,
(q) a valve member movable to selectively open and close the air intake and fluid discharge ports,
(r) and actuator means connected to said valve and operable during rotation of said casing for moving said valve in opening and closing said ports.

3. A variable speed hydraulic coupling interposed between rotary power driven means and a driven shaft comprising,
(a) a rotatable casing having opposed ends with openings at each end, said casing having a peripheral wall that extends from adjacent one end to the other end and terminates at said opening at said other end,
(b) an end plate secured to the peripheral wall at said one end in fluid-tight engagement to close the opening therein,
(c) a second end plate secured to the peripheral wall at said other end in fluid-tight engagement to close the opening therein,
(d) a drive shaft operatively connected with the rotary power driven means and having one end secured to said second end plate to rotate the casing in response to rotation of the drive shaft,
(e) said driven shaft being rotatably mounted in said one end plate and extending into said casing coaxially of said drive shaft,
(f) a gear pump type transmission mechanism including a body in said casing,
(g) a manifold plate,
(h) means securing the manifold plate to said second end plate with the pump body therebetween whereby said second end plate and manifold plate are sides of said pump mechanism,
(i) said manifold plate having a periphery slightly spaced from the peripheral wall of the casing to define a thin oil passage therebetween,
(j) said pump having a sun gear fixed to the driven shaft and a plurality of planet gears rotatably mounted in said body in meshing engagement with the sun gear to form pumps,
(k) said body having inlet and outlet chambers oppositely disposed relative to the meshing portions of the respective planet and sun gears,
(l) said casing being partially filled with oil whereby during rotation of said casing there is provided an outer and inner zone of oil and an inner central zone of air with said inlet and outlet chambers radially inwardly of said oil zone,
(m) a plurality of oil inlet passages in said body communicating the inlet chambers with the oil zone between the body and the casing and having inlet openings disposed within the zone of oil constantly fully open to the inflow of oil to the inlet chambers of said pump mechanism,
(n) a cylindrical axial extension on said manifold plate and in the air zone, said extension and manifold plate having an axial bore defining a passage surrounding the driven shaft and communicating the air zone with the interior of the pump body in inwardly spaced relation to the inlet and outlet chambers in the pump body,
(o) a plurality of radially disposed air intake ports in said extension and having communication therethrough to the inlet chambers,
(p) a plurality of radially disposed fluid discharge ports circumferentially spaced from the air intake ports and having communication through said extension with the outlet chambers,
(q) a valve member sleeved on said extension and movable axially thereof to selectively open and close the air intake and fluid discharge ports,
(r) and actuator means connected to said valve and extending through said one end plate exteriorly of said casing and operable during rotation of said casing for moving said valve in port-opening and closing movement.

4. A variable speed hydraulic coupling interposed between rotary power driven means and a driven shaft comprising,
(a) a rotatable casing having opposed ends with openings at each end, said casing having a peripheral wall that extends substantially longitudinally from adjacent one end to the other end and terminates at said opening at said other end,
(b) an end plate secured to the peripheral wall at said one end in fluid-tight engagement to close the opening therein,
(c) a second end plate secured to the peripheral wall at said other end in fluid-tight engagement to close the opening therein,
(d) a drive shaft operatively connected with the rotary power driven means and having one end secured to said second end plate to rotate the casing in response to rotation of the drive shaft,
(e) said driven shaft being rotatably mounted in said one end plate and extending into said casing coaxially of said drive shaft and having an end portion,
(f) bearing means recessed in said second end plate for rotatably supporting said end portion of said driven shaft,
(g) a gear pump type transmission mechanism including a body in said casing,
(h) a manifold plate,
(i) means securing the manifold plate to said second end plate with the pump body therebetween whereby said second end plate and manifold plate are sides of said pump mechanism,
(j) said manifold plate having a periphery slightly spaced from the peripheral wall of the casing to define a thin oil passage therebetween, (k) said pump having a sun gear fixed to the driven shaft adjacent said shaft end portion and a plurality of planet gears rotatably mounted in said body in meshing engagement with the sun gear to form pumps, (l) said body having inlet and outlet chambers oppositely disposed relative to the meshing portions of the respective planet and sun gears, (m) said casing being partially filled with oil whereby during rotation of said casing there is provided an outer and inner zone of oil and an inner central zone of air with said inlet and outlet chambers radially inwardly of said oil zone, (n) a plurality of oil inlet passages in said body communicating the inlet chambers with the oil zone between the body and the casing and having inlet openings disposed within the zone of oil constantly fully open to the inflow of oil to the inlet chambers of said pump mechanism, (o) a cylindrical axial extension on said manifold plate and in the air zone, said extension and manifold plate having an axial bore defining a passage surrounding the driven shaft and communicating the air zone with the interior of the pump body in inwardly spaced relation to the inlet and outlet chambers in the pump body, (p) a plurality of radially disposed air intake ports in said extension and having communication therethrough to the inlet chambers, (q) a plurality of radially disposed fluid discharge ports circumferentially spaced from the air intake ports and having communication through said extension with the outlet chambers, (r) a valve member sleeved on said extension and movable axially thereof to selectively open and close the air intake and fluid discharge ports, (s) an actuator means connected to said valve and extending through said one end plate exteriorly of said casing and operable during rotation of said casing for moving said valve in port-opening and closing movement.

5. A variable speed hydraulic coupling interposed between rotary power driven means and a driven shaft comprising, (a) a rotatable casing having opposed ends with openings at each end, said casing having a peripheral wall that extends substantially longitudinally and outwardly from adjacent one end to define a substantially frusto-conical portion and then longitudinally therefrom to define a substantially cylindrical portion that extends to the other end and terminates at said opening at said other end, (b) an end plate secured to the peripheral wall at said one end in fluid-tight engagement to close the opening therein, (c) a second end plate secured to the peripheral wall at said other end in fluid-tight engagement to close the opening therein, (d) a drive shaft operatively connected with the rotary power driven means and having one end secured to said second end plate to rotate the casing in response to rotation of the drive shaft, (e) said driven shaft being rotatably mounted in said one end plate and extending into said casing coaxially of said drive shaft and having an end portion, (f) bearing means recessed in said second end plate for rotatably supporting said end portion of said driven shaft, (g) a gear pump type transmission mechanism including a body in said casing, (h) a manifold member, (i) means securing the manifold member to said second end plate with the pump body therebetween whereby said second end plate and manifold member are sides of said pump mechanism, (j) said manifold member having a periphery slightly spaced from the peripheral wall of the casing to define a thin oil passage therebetween, (k) said pump having a sun gear fixed to the driven shaft adjacent said shaft end portion and a plurality of planet gears rotatably mounted in said body in meshing engagement with the sun gear to form pumps, (l) said body having inlet and outlet chambers oppositely disposed relative to the meshing portions of the respective planet and sun gears, (m) said casing being partially filled with oil whereby during rotation of said casing there is provided an outer and inner zone of oil and an inner central zone of air with said inlet and outlet chambers radially inwardly of said oil zone, (n) a plurality of oil inlet passages in said body communicating the inlet chambers with the oil zone between the body and the casing and having inlet openings disposed within the zone of oil constantly fully open to the inflow of oil to the inlet chambers of said pump mechanism, (o) said manifold member having an axial bore defining a passage surrounding the driven shaft and communicating the air zone with the interior of the pump body in inwardly spaced relation to the inlet and outlet chambers in the pump body, (p) a plurality of radially disposed air intake ports in said manifold member and having communication therethrough to the inlet chambers, (q) a plurality of radially disposed fluid discharge ports in said manifold member circumferentially spaced from the air intake ports and having communication therethrough with the outlet chambers, (r) and a valve member to selectively open and close the air intake and fluid discharge ports.

6. A variable speed hydraulic coupling interposed between rotary power driven means and a driven shaft comprising, (a) a rotatable casing having opposed ends with openings at each end, said casing having a peripheral wall that extends substantially longitudinally and outwardly from adjacent one end to define a substantially frusto-conical portion and then longitudinally therefrom to define a substantially cylindrical portion that extends to the other end and terminates at said opening at said other end, (b) an end plate secured to the peripheral wall at said one end in fluid-tight engagement to close the opening therein, (c) a second end plate secured to the peripheral wall at said other end in fluid-tight engagement to close the opening therein, (d) a drive shaft operatively connected with the rotary power driven means and having one end secured to said second end plate to rotate the casing in response to rotation of the drive shaft, (e) said driven shaft being rotatably mounted in said one end plate and extending into said casing coaxially of said drive shaft and having an end portion, (f) bearing means recessed in said second end plate for rotatably supporting said end portion of said driven shaft, (g) a gear pump type transmission mechanism including a body in said casing, (h) a manifold plate, (i) means securing the manifold plate to said second end plate with the pump body therebetween whereby said second end plate and manifold plate are sides of said pump mechanism, (j) said manifold plate having a periphery slightly spaced from the peripheral wall of the casing to define a thin oil passage therebetween, (k) said pump having a sun gear fixed to the driven shaft adjacent said shaft end portion and a plurality of planet gears rotatably mounted in said body in meshing engagement with the sun gear to form pumps, (*l*) said body having inlet and outlet chambers oppositely disposed relative to the meshing portions of the respective planet and sun gears, (*m*) said casing being partially filled with oil whereby during rotation of said casing there is provided an outer and inner zone of oil and an inner central zone of air with said inlet and outlet chambers radially inwardly of said oil zone, (*n*) a plurality of oil inlet passages in said body communicating the inlet chambers with the oil zone between the body and the casing and having inlet openings disposed within the zone of oil constantly fully open to the inflow of oil to the inlet chambers of said pump mechanism, (*o*) a cylindrical axial extension on said manifold plate and in the air zone, said extension and manifold plate having an axial bore defining a passage surrounding the driven shaft and communicating the air zone with the interior of the pump body in inwardly spaced relation to the inlet and outlet chambers in the pump body, (*p*) a plurality of radially disposed air intake ports in said extension and having communication therethrough to the inlet chambers, (*q*) a plurality of radially disposed fluid discharge ports circumferentially spaced from the air intake ports and having communication through said extension with the outlet chambers, (*r*) a valve member sleeved on said extension and movable axially thereof to selectively open and close the air intake and fluid discharge ports, (*s*) and actuator means connected to said valve and extending through said one end plate exteriorly of said casing and operable during rotation of said casing for moving said valve in opening and closing said ports.

References Cited by the Examiner
UNITED STATES PATENTS

| | | | |
|---|---|---|---|
| 1,954,418 | 4/34 | Ley | 192—61 |
| 2,644,561 | 7/53 | Dikeman | 192—61 |
| 2,899,035 | 8/59 | Thomas | 192—61 |
| 3,078,976 | 2/63 | Whinery et al. | 192—61 |

DON A. WAITE, *Primary Examiner.*